United States Patent
Holt et al.

(10) Patent No.: US 7,416,265 B2
(45) Date of Patent: Aug. 26, 2008

(54) APPARATUS AND METHOD FOR VARYING BRAKE RESPONSE OF A VEHICLE

(75) Inventors: Bradford J. Holt, Peoria, IL (US); Jeffrey E. Jensen, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/304,340

(22) Filed: Nov. 26, 2002

(65) Prior Publication Data

US 2004/0100145 A1 May 27, 2004

(51) Int. Cl.
*B60T 8/32* (2006.01)
(52) U.S. Cl. .......................... 303/191; 477/92
(58) Field of Classification Search ................. 303/112, 303/191; 180/197, 249, 233, 247; 477/92
See application file for complete search history.

(56) References Cited

U.S. PATENT DOCUMENTS

| | | | |
|---|---|---|---|
| 3,659,479 A | 5/1972 | Kiss | |
| 4,696,380 A * | 9/1987 | Kita | 192/221 |
| 5,026,335 A * | 6/1991 | Oftedal et al. | 180/233 |
| 5,069,085 A | 12/1991 | Iizuka | |
| 5,105,923 A * | 4/1992 | Iizuka | 192/220 |
| 5,154,250 A | 10/1992 | Mural | |
| 5,172,611 A | 12/1992 | Eymuller et al. | |
| 5,173,859 A | 12/1992 | Deering | |
| 5,330,030 A * | 7/1994 | Eastman et al. | 180/233 |
| 5,351,776 A * | 10/1994 | Keller et al. | 180/79.1 |
| 5,363,938 A * | 11/1994 | Wilson et al. | 180/233 |
| 5,456,333 A * | 10/1995 | Brandt et al. | 180/336 |
| 5,667,457 A | 9/1997 | Kuriyama et al. | |
| 5,754,967 A * | 5/1998 | Inoue et al. | 303/112 |
| 5,803,864 A * | 9/1998 | Yoo | 477/119 |
| 5,808,909 A | 9/1998 | Rees | |
| 5,810,694 A | 9/1998 | Kamada et al. | |
| 6,009,368 A | 12/1999 | Labuhn et al. | |
| 6,019,699 A | 2/2000 | Hoshiya et al. | |
| 6,056,373 A | 5/2000 | Zechmann et al. | |
| 6,076,622 A | 6/2000 | Chakraborty et al. | |
| 6,141,615 A | 10/2000 | Saito et al. | |
| 6,162,146 A * | 12/2000 | Hoefling | 477/73 |
| 6,175,797 B1 | 1/2001 | Iizuka | |
| 6,216,076 B1 | 4/2001 | Takiguchi et al. | |
| 6,233,515 B1 | 5/2001 | Engelman et al. | |
| 6,259,984 B1 | 7/2001 | Kanzaki et al. | |

(Continued)

FOREIGN PATENT DOCUMENTS

JP   2001-254818   3/2000

(Continued)

*Primary Examiner*—Robert A. Siconolfi
*Assistant Examiner*—Vu Q Nguyen
(74) *Attorney, Agent, or Firm*—Liell & McNeil

(57) ABSTRACT

A vehicle has a brake operator device adapted to travel in a range of brake operator device positions and produce a brake input signal, and a transmission adapted to produce a transmission gear signal. An electronic control module receives the brake input signal and the transmission gear signal and responsively controls engine braking, brake engagement, and/or a transmission downshift. The engine, brakes, and transmission are controlled differently responsive to the brake operator device position depending upon the transmission being in a higher or lower gear. In addition, braking is controlled during a downshift to avoid jerk.

26 Claims, 2 Drawing Sheets

U.S. PATENT DOCUMENTS

| | | |
|---|---|---|
| 6,269,293 B1 | 7/2001 | Correa et al. |
| 6,269,295 B1 * | 7/2001 | Gaugush et al. ............... 701/55 |
| 6,311,117 B1 | 10/2001 | Winner et al. |
| 6,336,689 B1 | 1/2002 | Eguchi et al. |
| 6,345,226 B1 | 2/2002 | Koga et al. |
| 6,374,174 B2 | 4/2002 | Hellmann et al. |
| 6,389,346 B1 | 5/2002 | Gianoglio et al. |
| 6,551,212 B2 * | 4/2003 | Skinner et al. ................ 477/73 |

FOREIGN PATENT DOCUMENTS

| | | |
|---|---|---|
| JP | 2000-205397 | 7/2000 |

* cited by examiner

APPARATUS AND METHOD FOR VARYING BRAKE RESPONSE OF A VEHICLE

TECHNICAL FIELD

This invention is of a form of an apparatus and method for varying brake response of a vehicle and, more specifically, such an apparatus and method which varies a combination of one or all of braking deadband, engine resistance, braking power, and transmission downshift dependent upon a transmission gear and a position of a brake operator device.

BACKGROUND

A vehicle such as a work machine, on- or off-highway truck, automobile, or other equipment has a brake operator device allowing an operator to control deceleration of the vehicle. The vehicle also has a transmission which allows the vehicle to be driven using one of several gear ratios, for desired torque and speed characteristics. Many vehicles include an Integrated Braking System (IBS), which uses a mechanical brake valve and a rotary position sensor associated with the brake operator device to detect a brake operator device angle position when the vehicle is in a higher gear.

Under IBS, the transmission is downshifted and/or neutralized to reduce dependence on the brakes to stop the machine. However, this configuration is subject to a deadband (no brake response within a predetermined initial portion of brake operator device travel) to facilitate the transmission-caused deceleration in the higher gears, with IBS active. Since the deadband cannot be adjusted during operation of a mechanical brake valve-equipped vehicle, the deadband reduces available brake operator device travel for braking in lower gears (when IBS is inactive). This reduced brake operator device travel results in lower resolution of the brake operator device and may cause an operator perception of less control over the brakes.

U.S. Pat. No. 5,105,923, issued Apr. 21, 1992 to Naonori Tizuka (hereafter referenced as '923) discloses an engine braking control system for an automatic transmission. The '923 device causes a downshift in response to engine braking requirements, vehicle speed, throttle opening, and brake operator device position. However, the transmission gear selected is not taken into account in '923, so the vehicle response cannot differ when the vehicle is traveling in different gears.

The present invention is directed to overcoming one or more of the problems as set forth above.

SUMMARY OF THE INVENTION

In a preferred embodiment of the present invention, an apparatus for varying brake response of a vehicle is disclosed. The apparatus includes a brake operator device, a brake, a transmission, and an electronic control module. The brake operator device is movable within a range of brake operator device positions and is adapted to produce a brake input signal responsive to an operator brake command. The brake resists motion of the vehicle responsive to a brake output signal. The transmission has a plurality of gears and is adapted to produce a transmission gear signal responsive to a selected one of the gears. The electronic control module is adapted to receive the brake input and transmission gear signals and responsively produce a brake output signal. A position of the brake operator device within the range of brake operator device positions dictates the existence and magnitude of the brake output signal.

In a preferred embodiment of the present invention, a vehicle is disclosed. The vehicle includes a vehicle body, an operator compartment carried by the vehicle body, a ground engaging system, and an integrated brake system. The integrated brake system includes a brake operator device, a brake, a transmission, and an electronic control module. The brake operator device is movable within a range of brake operator device positions and is adapted to produce a brake input signal responsive to an operator brake command. The brake resists motion of the vehicle responsive to a brake output signal. The transmission has a plurality of gears and is adapted to produce a transmission gear signal responsive to a selected one of the gears. The electronic control module is adapted to receive the brake input and transmission gear signals and responsively produce a brake output signal. A position of the brake operator device within the range of brake operator device positions dictates the existence and magnitude of the brake output signal.

In a preferred embodiment of the present invention, a method for varying brake response of a vehicle. The method includes the steps of: producing a brake input signal responsive to a position of a brake operator device within a range of brake operator device positions; producing a transmission gear signal responsive to a selected one gear of a plurality of gears in a transmission; producing a brake output signal responsive to the brake input and transmission gear signals; and controlling engagement of a brake responsive to the brake output signal.

DETAILED DESCRIPTION

Figure 1:
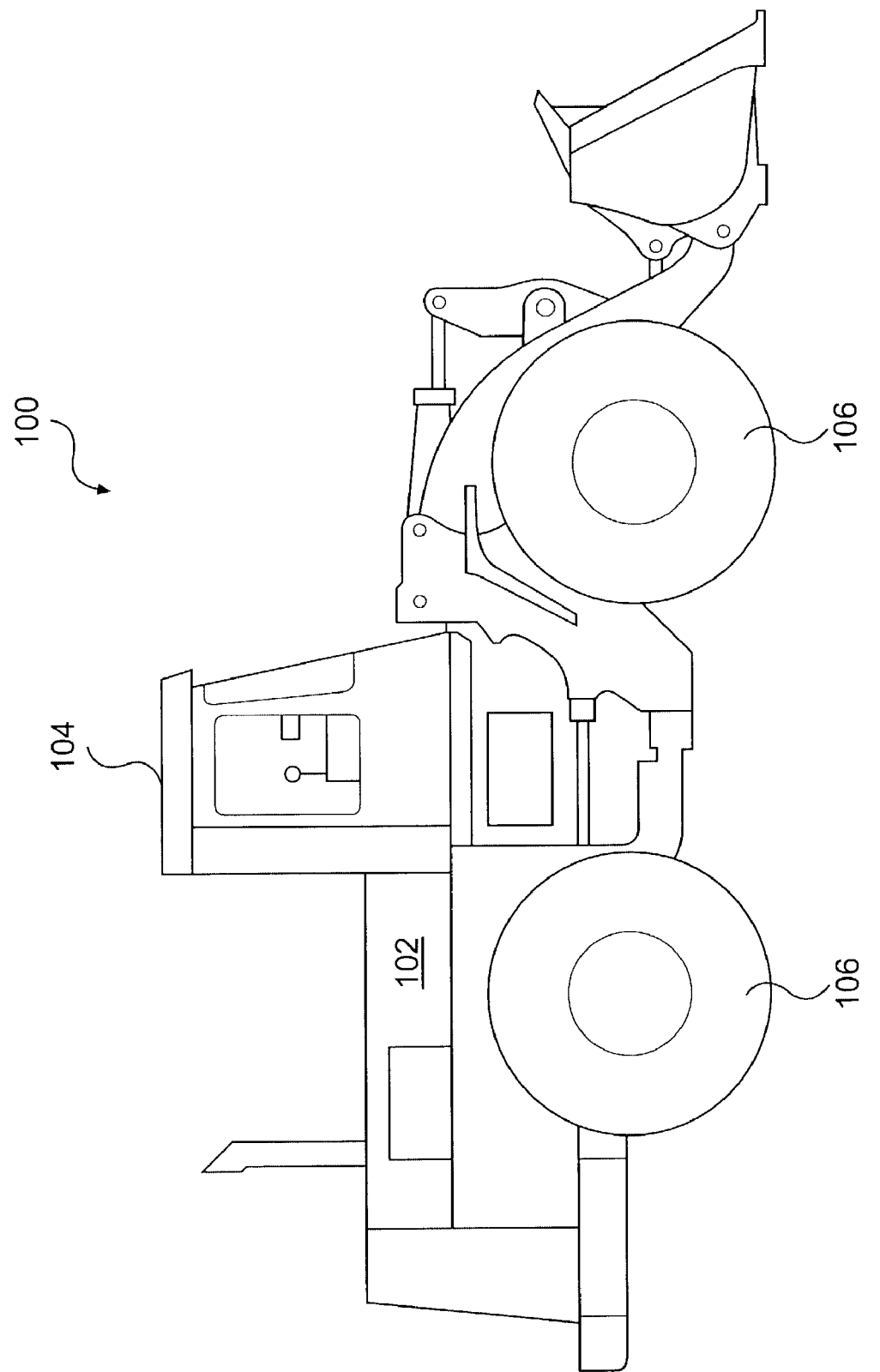
FIG. 1 is a side view of a vehicle including a preferred embodiment of the present invention.
Figure 2:
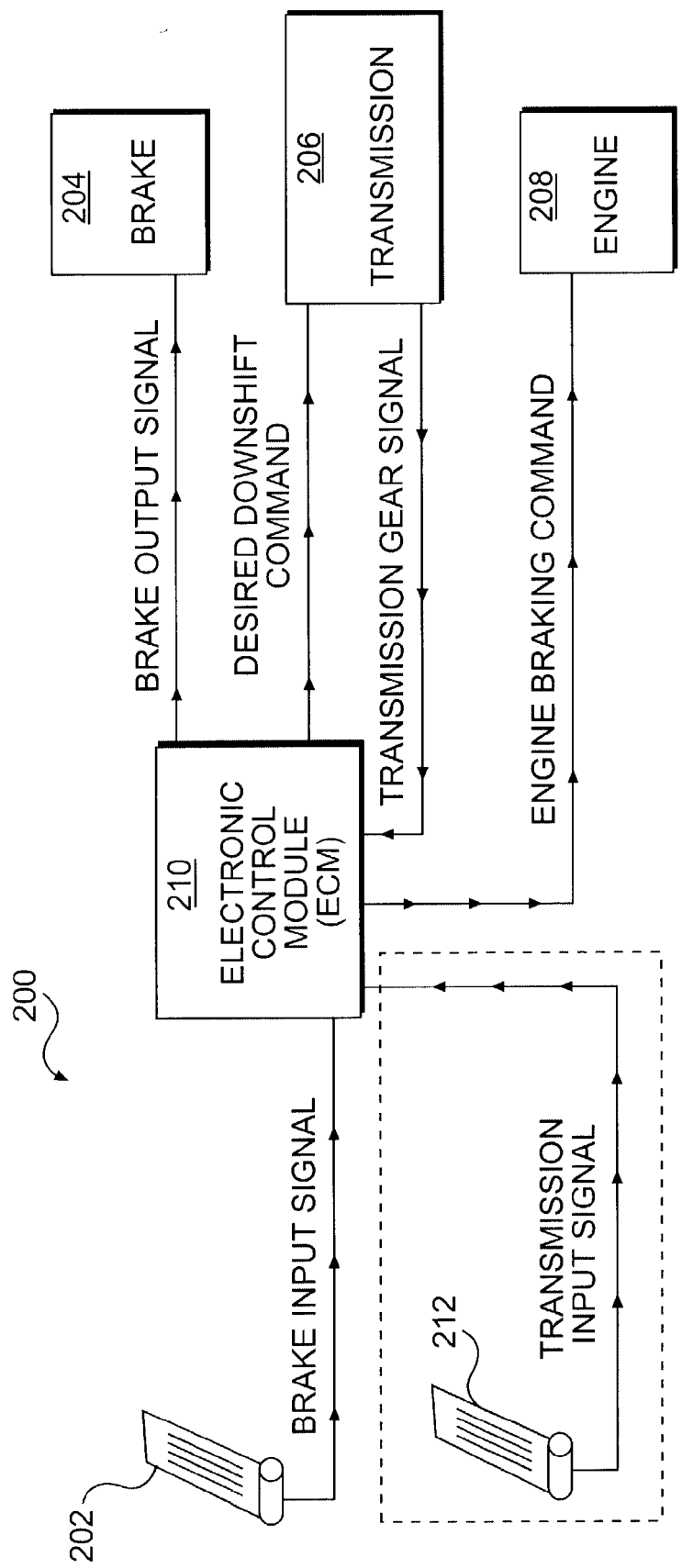
FIG. 2 is a schematic of an integrated brake system according to a preferred embodiment of the present invention.

A vehicle 100, shown in FIG. 1, includes a vehicle body 102, an operator compartment 104 carried by the vehicle body 102, a ground engaging system 106, and an integrated brake system, not visible in FIG. 1 but shown in FIG. 2. The integrated brake system 200 includes a brake operator device 202, a brake 204 associated with the ground engaging system 106, a transmission 206, an engine 208, and an electronic control module (ECM) 210.

The brake operator device 202 may be any one of a range of devices, such as a pedal, lever, dial, switch, or any other suitable device, able to produce a brake input signal in response to an operator brake command. The brake operator device 202 will be discussed herein as a brake operator device movable within a range of brake operator device positions. The brake 204 resists movement of the ground engaging system and thereby the vehicle in response to a brake output signal, either generated automatically or taken directly from the brake input signal.

The transmission 206 has a plurality of gears and is adapted to produce a transmission gear signal indicative of the one gear selected for current use. The transmission 206 also can receive an automatic or operator-controlled shift command and responsively perform the desired shift. Optionally (as indicated by the dotted line in FIG. 2), the vehicle 100 also includes a transmission operator device 212 or other device which produces a transmission input signal in response to an operator transmission command, to allow for operator control of a manual or partially-manual transmission. Additionally, the transmission 206 may be neutralized in response to the brake operator device 202 being at a predetermined brake operator device position or positions.

The engine 208 provides motive power to the vehicle 100 and also supplies resistance in a known manner, commonly termed "engine braking", in response to an engine braking command. Engine braking is commonly accomplished by allowing torque from the ground engaging system 106 to feed back through the transmission 206 into the engine 208. The feedback torque causes the engine cycle to reverse, and air pressure in the engine cylinders resists the feedback torque to slow the vehicle 100. It is also possible for the air in the engine cylinders, which becomes pressurized during engine braking, to serve as a source of compressed air for other vehicle needs. Engine braking is generally controlled by the ECM 210 operating the engine 208 to accept the feedback torque.

The ECM 210 receives the brake input signal, transmission gear signal, and transmission input signal (if provided) and responsively produces at least one of a brake output signal, an engine braking command, and a desired downshift command. The brake output signal is sent to the brake, the engine braking command is sent to the engine, and the desired downshift command is sent to the transmission. The existence and magnitude of the brake output signal, engine braking command, and desired downshift command are dependent upon the position of the brake operator device 202 within the range of brake operator device positions and upon the value of the transmission gear signal.

When an operator transmission command or an ECM-generated desired downshift command controls the transmission, optionally the brake output signal is also controlled such that the engagement of the brake is reduced or eliminated for at least a portion of the time that the transmission is downshifting. This automatic brake control in conjunction with a transmission shift functions to bring the vehicle speed down gradually such that the downshift is performed smoothly and without a "jerk" or impact felt by the operator. The reduction or disengagement of braking avoids jerk caused by sudden deceleration due to both the brake and the downshift effecting the vehicle speed.

In an embodiment of the present invention, the brake operator device 202 has a deadband within the range of brake operator device positions. A deadband is an area of initial brake operator device travel in which no braking action is commanded. Often a deadband is provided to protect the brakes 204 in case an operator rides the brake operator device 202 or to prevent the brake operator device 202 from seeming overly sensitive. In the present invention, engine braking or a transmission neutralization or downshift may be commanded when the brake operator device 202 is in a deadband position, but no brake 204 engagement is commanded. The amount of deadband available in the range of brake operator device positions is dependent upon the selected transmission gear; a preferred scheme has more deadband available when the transmission 206 is in a higher gear than when the transmission 206 is in a lower gear. The reason for this preference is that when the transmission 206 is in a higher gear, engine braking and/or transmission 206 downshifting or neutralization will be first applied to decelerate the vehicle, and the longer deadband allows for those measures. In a lower gear, the brakes 204 will be applied in a larger portion of the brake operator device positions since the non-braking deceleration techniques used in the higher gear are a lesser priority, for example, because there might not be a lower gear for the transmission 206 to downshift or because the ground speed of the vehicle 100 is too low for the non-braking deceleration techniques to effectively stop the vehicle 100 in a reasonably short distance. A shorter deadband also gives the operator a wider range of brake operator device travel or brake operator device positions in which braking is active and therefore a feeling of better control over the brakes 204.

INDUSTRIAL APPLICABILITY

When the operator presses down on the brake operator device 202 to initiate deceleration of the vehicle 100, a brake input signal is provided to the ECM 210. The ECM 210 evaluates the transmission gear signal to determine whether the transmission 206 is in a higher gear or a lower gear, and produces at least one of a brake output signal, an engine braking command, and a desired downshift command responsive to the brake input signal and the transmission gear signal. The ECM 210 may use any suitable equation, lookup table, chart, combination thereof, or other suitable means to produce the brake output signal, engine braking command, and/or desired downshift command. An example of a suitable chart is given below as Table 1, but does not limit the ECM 210 of the present invention to the values or format shown.

TABLE 1

Example of suitable brake operator device position table.

| Brake Operator Device Position | Response in Higher Gear | Response in Lower Gear |
| --- | --- | --- |
| First Sixth of Travel | Deadband | Deadband |
| Second Sixth of Travel | Deadband/Engine Braking | Deadband/Engine Braking |
| Third Sixth of Travel | Deadband/Engine Braking | Brakes Activated |
| Fourth Sixth of Travel | Deadband/Downshift | Brakes Activated |
| Fifth Sixth of Travel | Brakes Activated | Brakes Activated |
| Last Sixth of Travel | Brakes Activated | Brakes Activated |

In addition, engagement of the brakes 204 is optionally reduced or eliminated during a downshift as described above, in order to provide a smooth transition to the lower gear without imparting jerk to the vehicle 100.

Other aspects, objects and advantages of the present invention can be obtained from a study of the drawings, the disclosure and the appended claims.

What is claimed is:

1. An apparatus for varying brake response of a vehicle, comprising:
    a brake operator device movable within a range of brake operator device positions and adapted to produce a brake input signal responsive to an operator brake command;
    a brake, resisting motion of the vehicle responsive to a brake output signal;
    a transmission having a plurality of gears and adapted to produce a transmission gear signal responsive to a selected one of the gears;
    an electronic control module adapted to receive the brake input and transmission gear signals and responsively produce a brake output signal as a function of the brake input and transmission gear signals; and
    wherein the brake operator device has a deadband within the range of brake operator device positions, and the amount of deadband in each of the range of brake operator device positions is variable responsive to the transmission gear signal.

2. The apparatus of claim 1, including an engine, providing motive power to the vehicle and adapted to perform engine braking responsive to an engine braking command, wherein the electronic control module produces an engine braking command responsive to the brake input and transmission gear signals and wherein the position of the brake operator device within the range of brake operator device positions effects the existence and magnitude of the engine braking command.

3. The apparatus of claim 1, wherein the electronic control module produces a desired downshift command responsive to the brake input and transmission gear signals and the selected one of the gears is chosen responsive to the desired downshift command.

4. The apparatus of claim 3, wherein engagement of the brake is reduced or eliminated during a downshift commanded by the desired downshift command.

5. The apparatus of claim 1, wherein more deadband is available when a higher gear is selected than when a lower gear is selected.

6. The apparatus of claim 5, wherein an engine braking command is produced responsive to the brake operator device being in a deadband position.

7. The apparatus of claim 1, wherein the transmission is neutralized responsive to the brake operator device being in at least one predetermined brake operator device position.

8. The apparatus of claim 1, wherein the vehicle includes a wheeled ground engagement system.

9. The apparatus of claim 8 wherein the vehicle is a wheel loader.

10. A method for varying brake response of a vehicle, comprising:
producing a brake input signal responsive to a position of a brake operator device within a range of brake operator device positions;
producing a transmission gear signal responsive to a current gear ratio in a transmission;
producing a brake output signal responsive to the brake input and transmission gear signals;
controlling engagement of a brake responsive to the brake output signal; and
providing an amount of deadband in the range of brake operator device positions, the amount of deadband being variable responsive to the transmission gear signal.

11. The method of claim 10, including:
producing an engine braking command responsive to the brake input and transmission gear signals; and
performing engine braking responsive to the engine braking command.

12. The method of claim 10, including:
producing a desired downshift command responsive to the brake input and transmission gear signals.

13. The method of claim 12, including:
reducing or eliminating engagement of the brake during a downshift commanded by the desired downshift command.

14. The method of claim 10, including:
producing an engine braking command responsive to the brake operator device being in a deadband position.

15. The method of claim 10, including:
neutralizing the transmission responsive to the brake operator device being in at least one predetermined brake operator device position.

16. The method of claim 10 wherein the vehicle includes a wheeled ground engagement system.

17. The method of claim 16 wherein the vehicle is a wheel loader.

18. A vehicle comprising:
a brake operator device movable by the operator to a brake operator device position within a range of brake operator device positions, the brake operator device producing a brake input signal representative of the current brake operator device position;
a brake which resists motion of the vehicle responsive to a brake output signal;
a transmission having a range of gear ratios and adapted to produce a transmission gear signal representative of the current gear ratio;
an electronic control module (ECM) receiving the brake input signal and the transmission gear signal, the ECM producing the brake output signal at least as a function of the transmission gear signal;
wherein the ECM produces the brake output signal at least as a function of the brake input signal; and, wherein:
when the brake operator device is in a first position and the transmission is in a high gear ratio, the ECM sends a signal to commence an engine brake or a transmission downshift; and
when the brake operator device is in the first position and the transmission is in a low gear ratio, the ECM sends the brake output signal.

19. The vehicle of claim 18 wherein the vehicle includes a wheeled ground engagement system.

20. The vehicle of claim 19 wherein the vehicle is a wheel loader.

21. A vehicle comprising:
a brake operator device movable by the operator from an off position to a brake operator device position within a range of brake operator device positions, the brake operator device producing a brake input signal representative of its position;
a brake which resists motion of the vehicle responsive to a brake output signal;
an engine providing motive power to a transmission;
a transmission having at least a high gear ratio and a low gear ratio and adapted to produce a transmission gear signal representative of the current gear ratio;
an electronic control module (ECM) receiving the brake input signal and the transmission gear signal, and producing the brake output signal; wherein
when the transmission is in the high gear ratio and the brake operator device is in a first brake operator device position, the ECM does not send the brake output signal, and when the transmission is in the low gear ratio and the brake operator device is in the first brake operator device position, the ECM sends the brake output signal.

22. A vehicle according to claim 21 wherein when the transmission is in the high gear ratio and the brake operator device is in the first brake operator device position, the ECM sends a signal to reduce the speed of the vehicle using one or more methods that do not require actuation of the vehicle's brake.

23. A vehicle according to claim 22 wherein when the transmission is in the high gear ratio and the brake operator device is in the first brake operator device position, the ECM sends a signal to reduce the speed of the vehicle by performing at least one of signaling the engine to perform an engine brake, and signaling the transmission to perform a downshift.

24. A vehicle according to claim 22 wherein:
the brake operator device has sub-ranges within its range of brake operator device positions, the sub-ranges including at least a first sub-range of positions when the operator moves the brake operator device from the off position, the first brake operator device position existing within the first sub-range, and a second sub-range of positions when the operator further moves the brake operator device beyond the first sub-range, the second sub-range including a second brake operator device position; and when the transmission is in the high gear ratio and the brake operator device is in the second brake operator device position, the ECM sends the brake output signal, and when the transmission is in the low gear ratio and the brake operator device is in the second brake operator device position, the ECM sends the brake output signal.

25. The vehicle of claim 21 wherein the vehicle includes a wheeled ground engagement system.

26. The vehicle of claim 25 wherein the vehicle is a wheel loader.

* * * * *

UNITED STATES PATENT AND TRADEMARK OFFICE
CERTIFICATE OF CORRECTION

PATENT NO. : 7,416,265 B2 Page 1 of 1
APPLICATION NO. : 10/304340
DATED : August 26, 2008
INVENTOR(S) : Bradford Holt It is certified that error appears in the above-identified patent and that said Letters Patent is hereby corrected as shown below:

Please correct the Specification as follows:
Column 1, line 39, delete "Tizuka" and insert -- Iizuka --.

Signed and Sealed this

Twenty-fourth Day of February, 2009

JOHN DOLL
*Acting Director of the United States Patent and Trademark Office*